Patented Feb. 4, 1947

2,415,070

UNITED STATES PATENT OFFICE 2,415,070

MALT COMPOSITIONS

Hans F. Bauer and Elmer F. Glabe, Chicago, Ill., assignors, by mesne assignments, to Stein, Hall & Co., Inc., a corporation of New York No Drawing. Application October 15, 1942, Serial No. 462,146

6 Claims. (Cl. 99—224)

This invention relates to malt compositions, more particularly malt syrups and concentrates normally subject to spoilage in the absence of preservatives.

As is well known, malt syrups, that is to say, aqueous solutions or suspensions of malt in water, are fairly stable provided the concentration of solids is above about 80% by weight. This stability is apparently due to the presence of large amounts of sugars and the like. However, malt syrups containing less than about 80% solids tend to deteriorate or become unstable upon standing over a period of time, this deterioration or instability apparently being caused either by gas producing bacteria, wild yeasts or mold organisms. Hence, heretofore it has been customary to use preservatives in malt syrups which are subject to this deterioration, but these preservatives in many instances cannot be employed where the malt syrup is to be used in the preparation of foods or the ingredients of foods. One further factor which is of importance and must necessarily be considered in the treatment of malt syrups is that any agent which is added for any specific purpose should be such as to not adversely affect the Lintner value of the syrup which is a direct measure of its enzymatic action.

One of the objects of the invention is to provide new and improved malt compositions, more particularly syrups and concentrates which are normally subject to deterioration or instability upon standing and which are inhibited against such deterioration and instability by agents which are not harmful when employed in foods and which do not adversely affect the Lintner value or enzymatic action of the malt composition.

Other objects and advantages of the invention will be apparent by reference to the following description thereof.

In accordance with the invention it has been found that malt syrups which are normally unstable and tend to deteriorate with age can be rendered stable and inhibited against deterioration with age by incorporating therein a water soluble, complex acetate salt containing combined but undissociated acetic acid. In the practice of the invention it is preferable to prepare malt compositions of the type described containing sodium diacetate as the active essential ingredient for stabilizing the composition and inhibiting deterioration thereof. This preferred salt, sodium diacetate, may be given the formula:

$$2(CH_3COONa) \cdot 2(CH_3COOH) \cdot H_2O$$

As previously indicated, the malt compositions prepared in accordance with the invention will normally contain not more than 80% solids. The minimum amount of solids present is subject to relatively wide variation, although for most practical purposes it will not be lower than about 40% solids. The Lintner value, that is to say, the degree of activity of the enzymes, may be varied over a wide range without being affected by the complex acetate salt present.

One of the features of the invention is that the complex acetate salt may be employed in very small amounts ranging from about 0.1% to about 2%. The lower limit will be determined to some extent by the concentration of the malt syrup. Thus, for the less concentrated syrups it may be desirable to employ slightly larger amounts of the complex acetate salt in order to obtain the desired stability. However, above a certain point, which is usually not greater than 2% of the complex acetate salt by weight, there is no special advantage in employing larger quantities, although larger quantities may be employed if desired. The taste of the syrup may be a factor if relatively larger quantities of sodium diacetate are used, but the taste is not affected in general by the amounts of the complex acetate salts normally employed and normally effective for stabilization of the products.

The invention will be illustrated but is not limited by the following examples, in which the percentages are stated by weight unless otherwise indicated:

Example I

A blend of sodium diacetate was prepared which consisted of 95% by weight sodium diacetate and 5% by weight of sodium dihydrogen phosphate, the sodium dihydrogen phosphate being present as a stabilizing agent for the sodium diacetate and not contributing per se to the action of the sodium diacetate in stabilizing the malt compositions.

A malt syrup containing 65% solids (Malt Diastase Company, Brooklyn, New York) was divided into 6 aliquot portions. The first portion was used as a control and had nothing added to it. The second, third, fourth, fifth and sixth portions were treated, respectively, with 0.25%, 0.5%, 0.75%, 1.0% and 1.5% of the blend previously described.

These portions were then stored in individual closed bottles and placed in an incubator maintained at 98° F.

After 15 days the bottles were examined and it was observed that control sample No. 1 had a gassy fermented appearance. Foam was present and arose especially when the bottle was opened. The contents also had a fermented odor. In sample No. 2, containing 0.25% sodium diacetate, the appearance was all right, although there seemed to be a slight odor. In samples Nos. 3, 4, 5 and 6, both the appearance and odor were all right and no deterioration or instability could be observed.

*Example II*

All of the 6 bottles prepared as in Example I were recapped and allowed to stand at room temperature for 6 weeks. At the end of that time they were reexamined. The control sample No. 1 was much worse both in appearance and odor and had developed substantial pressure. Sample No. 2 had a faint frothy appearance around the edge of the bottle, had developed no pressure, had not fermented, but had a slight off odor. Samples Nos. 3, 4, 5 and 6 exhibited no signs of deterioration or instability.

Thus, it was demonstrated that stable malt compositions could be prepared in accordance with the invention. Although with a 65% concentration of solids the minimum amount of sodium diacetate required appeared to be in excess of 0.25%, where the malt composition was not used within 15 days, it will be understood that with higher concentrations the minimum amount of complex acetate salt may be somewhat less and with lower concentrations of solids it may be somewhat more. The Lintner value of the malt compositions prepared in the manner described was not affected.

In its broader aspects the invention contemplates the use of other types of complex acetate salts containing combined but undissociated acetic acid, and for a description of such salts reference is hereby made to United States Patent No. 2,271,756.

The invention provides new and improved stabilized malt compositions and thereby solves a special problem, particularly in the preparation of malt syrups which are to be used in foods or in the preparation of foods. These syrups are stabilized and in accordance with the invention it has been found that bacteria and molds which normally grow in malt syrups having a concentration less than 80% will not grow in malt compositions prepared in accordance with the invention.

Having thus described the invention, what we claim as new and desire to secure by Letters Patent of the United States is:

1. A malt syrup composition containing less than about 80% solids and having dispersed therein in amounts sufficient for the stabilization thereof a water soluble, alkali metal acetate salt containing combined but undissociated acetic acid.

2. A malt syrup containing 40% to 80% solids and having dispersed therein a minor proportion of a water soluble alkali metal acetate salt containing combined but undissociated acetic acid.

3. A malt syrup containing 40% to 80% solids and having dispersed therein a minor proportion but at least about $\frac{1}{10}$% by weight of the malt syrup of a water soluble, alkali metal acetate salt containing combined but undissociated acetic acid.

4. A malt syrup containing 40% to 80% solids and having dispersed therein a minor proportion above about $\frac{1}{10}$% by weight of the malt syrup of sodium diacetate.

5. A malt syrup containing less than 80% solids and having dispersed therein stabilizing amounts of a water soluble, alkali metal acetate salt containing combined but undissociated acetic acid, said amounts being within the range of about 0.1% to about 2% by weight of said composition.

6. A malt composition comprising a malt syrup containing less than 80% solids and a small amount of sodium diacetate as a stabilizing agent, said amount being less than about 2% by weight of said composition, but sufficient to have a stabilizing effect thereon.

HANS F. BAUER.
ELMER F. GLABE.

REFERENCES CITED

The following references are of record in the file of this patent:

UNITED STATES PATENTS

| Number | Name | Date |
|---|---|---|
| 2,022,139 | Meder | Nov. 26, 1935 |
| 1,311,709 | Plaisance | July 29, 1919 |
| 1,381,833 | Hoehl | June 14, 1921 |

FOREIGN PATENTS

| Number | Country | Date |
|---|---|---|
| 152,946 | Britain | Oct. 5, 1920 |
| 308,405 | Britain | Mar. 28, 1929 |

OTHER REFERENCES

Kirby, Frey, and Atkin (1935) "The Growth of Bread Molds as Influenced by Acidity," Cereal Chemistry, vol. 12, No. 3, May 1935, page 251.

Kirby, Atkin, and Frey (1937) "Further Studies on the Growth of Bread Molds as Influenced by Acidity," Cereal Chemistry, vol. 14, No. 6, Nov. 1937, page 878.

Wahl-Henius "American Handy Book of the Brewing, Malting and Auxiliary Trades," ed. 3, 1908, vol. 2, page 1075, Published by Wahl-Henius Institute, Chicago.

Rahr Malting Co. "A Century of Progress in Malting and Brewing," supplementary pages 11 and 12.